No. 661,367. Patented Nov. 6, 1900.
J. V. COATS.
PHOTOGRAPHIC SHUTTER.
(Application filed Apr. 26, 1900.)
(No Model.) 3 Sheets—Sheet 1.
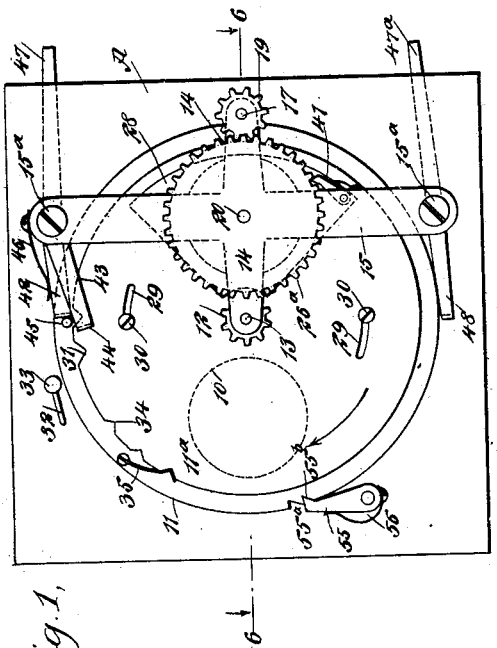
Fig. 1.
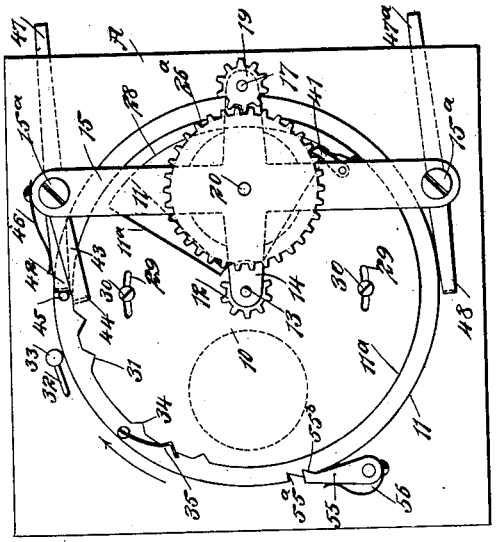
Fig. 4.
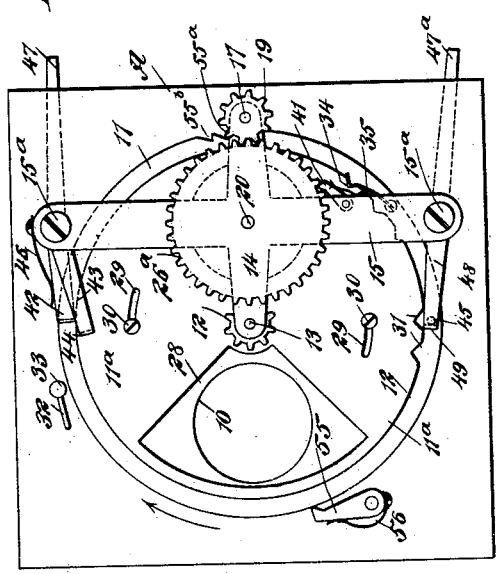
Fig. 2.
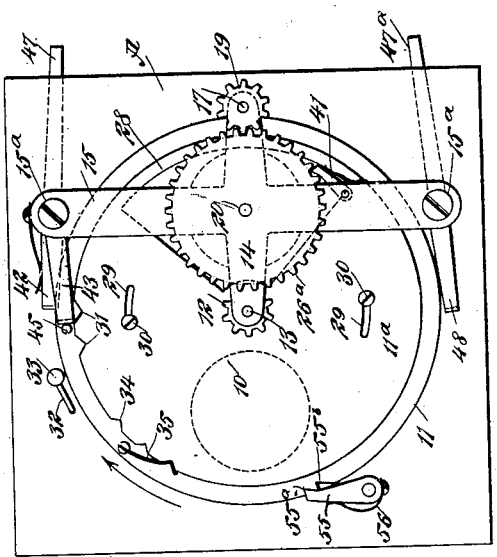
Fig. 3.
WITNESSES:
Edw. Thorpe
INVENTOR
John V. Coats.
BY 
ATTORNEYS
THE NORRIS PETERS CO., PHOTO-LITHO., WASHINGTON, D. C.

No. 661,367. Patented Nov. 6, 1900.
J. V. COATS.
PHOTOGRAPHIC SHUTTER.
(Application filed Apr. 26, 1900.)
(No Model.) 3 Sheets—Sheet 2.
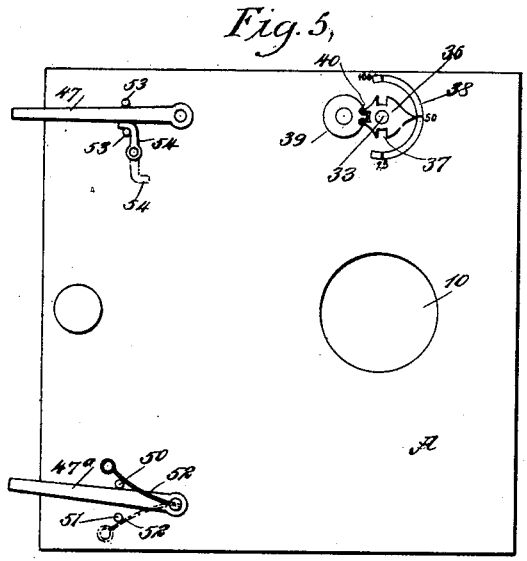
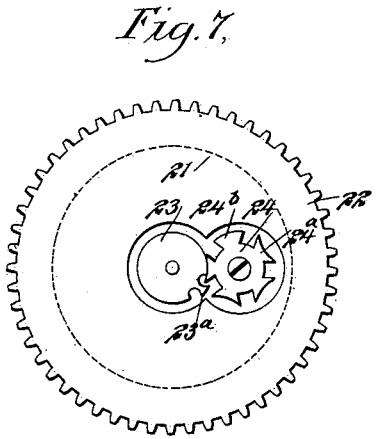
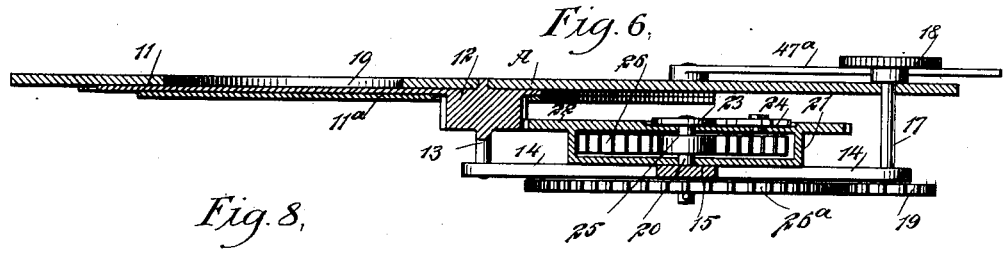
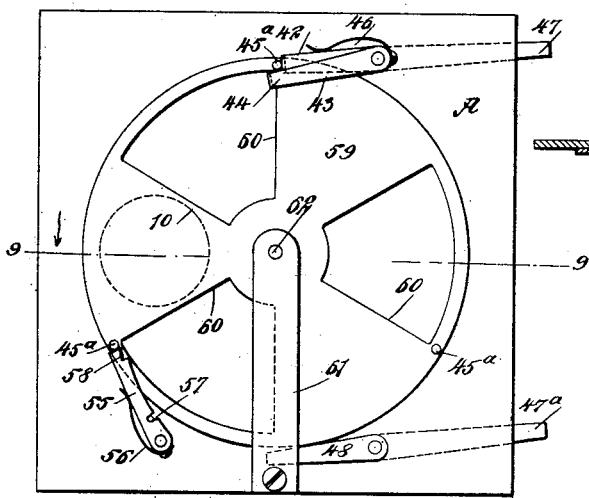
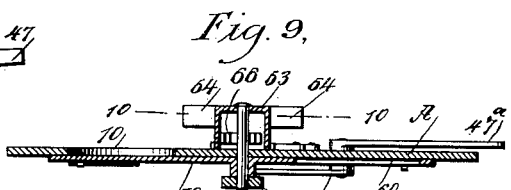
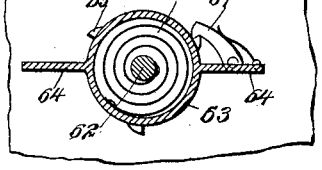
WITNESSES:
Edward Thorpe
INVENTOR
John V. Coats.
BY
ATTORNEYS
THE NORRIS PETERS CO., PHOTO-LITHO., WASHINGTON, D. C.

No. 661,367. Patented Nov. 6, 1900.
J. V. COATS.
PHOTOGRAPHIC SHUTTER.
(Application filed Apr. 26, 1900.)

(No Model.) 3 Sheets—Sheet 3.

WITNESSES:
Edward Thorpe

INVENTOR
John V. Coats.
BY
ATTORNEYS

THE NORRIS PETERS CO., PHOTO-LITHO., WASHINGTON, D. C.

UNITED STATES PATENT OFFICE.

JOHN V. COATS, OF SARATOGA SPRINGS, NEW YORK.

PHOTOGRAPHIC SHUTTER.

SPECIFICATION forming part of Letters Patent No. 661,367, dated November 6, 1900.

Application filed April 26, 1900. Serial No. 14,420. (No model.)

*To all whom it may concern:*

Be it known that I, JOHN V. COATS, a citizen of the United States, and a resident of Saratoga Springs, in the county of Saratoga and State of New York, have invented a new and Improved Shutter for Cameras, of which the following is a full, clear, and exact description.

One purpose of this invention is to provide a simple and improved spring-actuated shutter for cameras which may be operated for time or for instantaneous exposures at will, and to so control the winding mechanism for the shutter that the spring will be equal in action at all times and at no time fully exhausted.

Another purpose of the invention is to simplify the construction of shutters of the character above set forth and to provide for the winding of the spring-controlling mechanism and the operation of the shutter from the front of the camera.

Another purpose of the invention is to provide means whereby the opening or openings in the shutter may be quickly and conveniently enlarged or reduced as desired, such controlling mechanism for the shutter-openings being operated from the exterior of the camera.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 11:
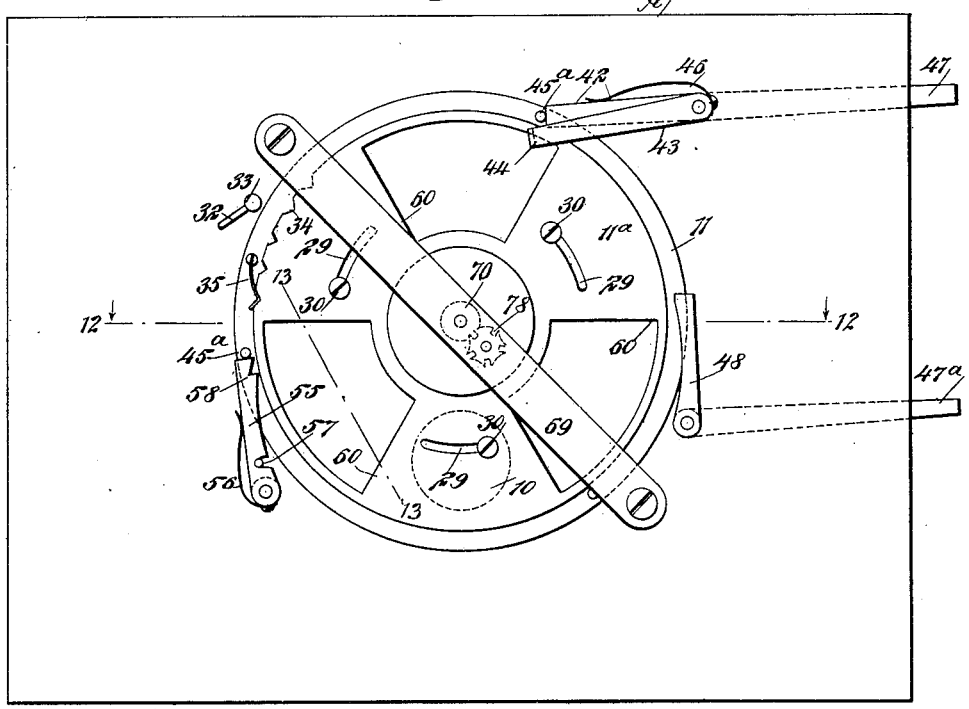
Figure 12:
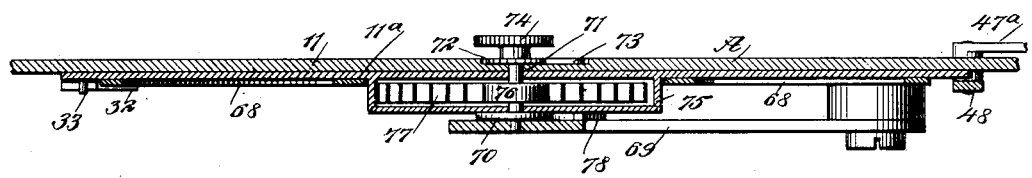
Figure 13:
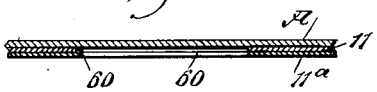
Figure 14:
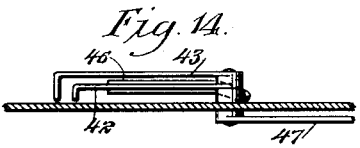

Figure 1 is an inner face view of the front plate or section of a camera, illustrating the shutter in its normal position. Fig. 2 is a similar view illustrating the position of the shutter when opened for time exposure. Fig. 3 is a view similar to those shown in Figs. 1 and 2, illustrating the position of the parts of the shutter just prior to the release of the lever which is to be operated for instantaneous exposure or which is to serve as a release for the shutter in time exposure. Fig. 4 is an inner face view of the front plate or member of the camera, illustrating the opening in the shutter as having been reduced in size. Fig. 5 is an outer face view of the front plate or member of the camera. Fig. 6 is a transverse section taken practically on the line 6 6 of Fig. 1. Fig. 7 is a front face view of a drum for the winding mechanism shown in Fig. 6, illustrating the mechanism employed for controlling the winding of the spring to prevent the spring being overwound. Fig. 8 is an inner face view of the front plate or member of the camera, illustrating the shutter as provided with a series of openings instead of with but a single opening, as illustrated in the other views. Fig. 9 is a transverse section taken practically on the line 9 9 of Fig. 8, illustrating a simplified form of winding mechanism for the shutter. Fig. 10 is a section taken substantially on the line 10 10 of Fig. 9 through the barrel containing the spring which is adapted to actuate the shutter. Fig. 11 is an inner face view of the front plate or member of the camera and shutter carried thereby, illustrating a slight deviation in sundry details of the construction shown in the other views. Fig. 12 is a horizontal section taken practically on the line 12 12 of Fig. 11. Fig. 13 is a section taken substantially on the line 13 13 of Fig. 11, and Fig. 14 is a sectional view through one portion of the shutter and a plan view of the release-lever for the shutter which is employed both in instantaneous and in time exposures.

A represents the front plate or member of a camera, said front plate or member A having an opening 10 therein, preferably circular and of any desired diameter, and the opening 10 is located at one side of the center of the said plate or member A.

Under the construction shown in Figs. 1, 2, 3, and 4 the shutter consists mainly of two circular plates 11 and 11ª, the outer plate 11 being of greater diameter than the inner plate 11ª. The outer plate 11 is provided at its center with a pinion 12, and this pinion 12 is preferably integral with an arbor 13, which arbor revolves in suitable bearings in the front camera plate or member A and in a cross-arm 14 of a bridge-bar 15, which bridge-bar extends from top to bottom of the camera plate or member A and is attached thereto by suitable studs or screws 15ª. The two plates 11 and 11ª of the shutter are adapted to turn together, although one plate may be shifted to a certain extent upon the opposing plate for the purpose of regulating the extent of the exposure-openings in the shutter-plates, as will be hereinafter set forth.

A shaft 17 is journaled in the camera plate or member A near one edge and in one of the cross bars or sections 14 of the bridge 15, and the shaft 17 is provided with a head 18 at its outer end or at the outer surface of the camera, so that the shaft 17 may be readily turned when the interior of the camera has been closed. A pinion 19 is secured to the inner end of the shaft 17, adapted for use in connection with a drum 21, which drum is provided with a spindle 20, and at the inner marginal face of the drum a gear 22 is formed, the teeth of which mesh with the teeth of the pinion 12, as shown in Fig. 6. The spindle 20 is provided with a collar 25 within the drum 21, and at the outer end of the spindle 20 a small wheel 23 is secured, (shown best in Fig. 7,) provided with a single tooth $23^a$ and with a recess at each side of the tooth. This tooth $23^a$ is adapted to engage with teeth on an adjacent wheel 24, also pivoted on the outer face of the drum 21, as shown in Fig. 7. The teeth on the wheel 24 are all provided with concaved peripheral surfaces $24^a$, with the exception of one tooth, the peripheral surface $24^b$ whereof is convexed, so that the tooth $23^a$ on the wheel 23, attached to the spindle 20, can turn the wheel 24 a distance only corresponding to the space occupied by the teeth having the concaved peripheral surfaces $24^a$; but when the tooth $23^a$ on the wheel 23 reaches the tooth having the convexed peripheral surface $24^b$ the tooth $23^a$ can travel no farther and the spring 26 in the drum 21 can be wound no more, because the tooth $23^a$ cannot pass the space between the convexed surface $24^b$ of the tooth on the wheel 24 and adjacent surface in the face of the drum. It will be understood that both wheels 23 and 24 are placed in depressions made in the outer face of the drum, as shown in Fig. 7.

The winding of the spring 26 is accomplished by causing the pinion 19 to engage with a gear $26^a$, secured to the inner end of the spindle 20, and the spring 26 is attached at one end to the collar 25 of the spindle 20 and at its opposite end to the interior of the drum 21. Before the spring is placed in the drum it is given a quarter wind or turn, and when the wheel 24 has been turned as far as possible by manipulating the head 18 of the shaft 17 the spring will have been given another quarter wind or turn, so that the central portion only of the spring is actually in action while the shutter is being operated, and the quarter-wind imparted to the spring by turning the shaft 17 enables the shutter to be operated for a given number of exposures. Under this construction the spring is never wound to its full capacity, nor is the spring ever entirely unwound. Therefore the action of the spring at the first exposure will be practically the same as the action of said spring at the last exposure, or just before it is necessary to rewind the spring.

The movement of the inner shutter-plate $11^a$ on the outer shutter-plate 11 is limited by producing slots 29 in the inner shutter-plate $11^a$ at each side of its center and passing pins 30 through these slots into the outer shutter-plate 11. Under the construction shown in Figs. 1, 2, 3, and 4 the two shutter-plates 11 and $11^a$ are each provided with a single opening 28, which openings are capable of being brought in direct registry one with the other, and these openings 28, although shown as segmental, may be of any desired contour.

It is sometimes desirable to reduce the size of the opening 28 in the outer shutter-plate 11, and this is accomplished through the medium of a foot 32, located at the inner face of the camera plate or member A, which foot is attached to a shaft 33, extending through the camera plate or member A to the front thereof, as illustrated in Fig. 5. This foot 32, which is virtually an arm, is adapted to enter either one of two notches 31, produced in the periphery of the smaller or inner shutter-plate $11^a$, and this same inner shutter-plate $11^a$ is provided with a series of three notches 34, preferably adjacent to the notches 31. The notches 34 are adapted to receive a detent 35, which is in the nature of a spring, attached to the outer shutter-plate 11, near the periphery of the same, as shown in Figs. 1, 2, 3, and 4.

The shaft 33 is turned from the outside of the camera in any suitable or approved manner, and usually this shaft 33 at its outer end is provided with a pointer 36, (shown in Fig. 5,) having a series of recesses 37 therein, three of such recesses being shown, and one portion of the pointer is adapted to travel over a scale 38, which is illustrated as having three points, one at each end and one at the center, one end point representing a twenty-fifth of a second, the intermediate point a fiftieth of a second, and the other end point a hundredth of a second, and these points indicate the length of exposure which will be given by the shutter when worked instantaneously when said pointer is in registry with any of the three given points on the scale. As illustrated, the pointer is turned, through the medium of a button 39, pivoted on the outer face of the camera plate or member A, which button is provided with a single tooth 40, adapted to enter any one of the recesses 37 in the pointer.

When the foot 32 is turned so as to be brought in engagement with one of the notches 31, it will move the inner shutter-plate $11^a$ a certain distance and will cause the said plate to correspondingly decrease the opening 28 in the outer shutter-plate 11, and by again turning the foot 32 so that it will enter the second notch 31 the inner shutter-plate $11^a$ will be turned farther and the opening 28 in the outer shutter-plate 11 will be again decreased in width, and the detent 35 will serve to hold the outer shutter-plate 11ª in its adjusted position.

The inner gear-wheel 26ª of the winding apparatus is provided with a suitable pawl 41. (Shown in Figs. 1, 2, 3, and 4.) It is obvious that by the arrangement of the gearing controlling the winding of the spring 26 said spring will be wound regularly and that the tension brought to bear upon the spring will be equal throughout the act of winding.

At what may be termed the "upper" end of the bridge 15 two check-arms—namely, a main and an auxiliary check-arm, designated, respectively, as 42 and 43—are located, and these arms are attached to a trip or operating lever 47, which is located at the front of the camera plate or member A, and this lever 47 is depressed whenever the shutter is to be operated. The two arms are placed one back of the other; but the forward or main check-arm 42 is shorter than the rear or auxiliary check-arm 43. The auxiliary arm diagonally crosses the main arm, as shown in Figs. 1, 2, 3, and 4, and the free end of each arm 42 and 43 is provided with a forwardly-extending flange 44. It will be observed that the check-arms extend over the shutter-plates.

As under the construction shown in Figs. 1, 2, 3, and 4 the shutter is provided with a single opening 28, a single stop-pin 45 is employed in the control of the shutter, which pin is placed upon the inner face of the front or outer shutter-plate 11, and as the shutter is operated this pin is adapted for engagement with the flanged end of the main check-arm 42, and when such an engagement occurs the shutter-plates are held stationary. A spring 46 is so placed that it bears upon the upper edge of the main check-arm 42 and holds said arm normally in such position that it must engage at proper time with the pin 45, as shown in Figs. 1 and 4. A second lever 47ª, which is a release-lever and is used in time exposures, is also located upon the front face of the camera plate or member A, and the pivot-pin of the release-lever 47ª extends through the camera-plate A at or near the bottom portion of the bridge 15. The pivot of the release-lever 47ª is attached to an arm 48, the free end whereof is forwardly flanged. The release-lever 47ª, as shown in Fig. 5, is limited in its movement by stops 50 and 51, located, respectively, above and below the lever, and a spring 52 is attached to the pivot or fulcrum of the lever 47ª, and said spring may be carried to an engagement with either of the stops 50 or 51. When the spring is in engagement with the lower stop 51, as shown in dotted lines in Fig. 5, the release-arm 48 is carried out of the path of the pin 45; but as this arm is adapted to be placed in position to engage with the said pin when the shutter is used for time exposures at such time the spring 52 is made to engage with the upper stop 50, as shown in positive lines in Fig. 5, whereupon the release-arm 48 will be placed in the position shown in Fig. 1. The operating or trip lever 47 is likewise limited in its movement by upper and lower stops 53, and when the camera is to be carried from place to place the said trip-lever is held stationary by means of a latch 54 engaging with its under surface and wedging it against the upper stop 53, as shown in Fig 5.

A detent 55 is pivoted upon the inner face of the camera plate or member A, and the upper end of said detent is held by a spring 56 over the marginal portion of the forward shutter-plate 11. The detent 55 is adapted to enter recesses 55ª and 55ᵇ made in the periphery of the shutter-plate 11. The detent enters the recess 55ª after the trip-lever has been pressed downward and remains there until the lever is released. After the trip-lever is released and the pin 45 is brought to its normal position—that is, in engagement with the check-arm 42, as shown in Figs. 1 and 4—the detent 55 enters the recess 55ᵇ. When the detent 55 is in the first recess 55ª, it serves to prevent the shutter-plates from moving backward or in the wrong direction, and when the detent enters the second recess 55ᵇ it prevents the shutter-plate 11 from rebounding as the stop-pin 45 strikes the main check-arm 42.

When the shutter is to be used for instantaneous work and the spring in the drum has been properly wound, it is simply necessary to press the trip-lever 47 downward, whereupon the main check-arm 42 will be carried away from the pin 45 in the outer shutter-plate, with which it engages, and the auxiliary check-arm will have been carried upward a sufficient distance to be in position for engagement with the pin 45 after an exposure has been made, and the shutter is meanwhile capable of turning to make an exposure, and when the exposure is made the shutter will be stopped by the pin 45 engaging with the auxiliary check-arm 43. This engagement between the pin 45 and the auxiliary check-arm will continue until the trip-lever 47 is released and while the pin 45 is in engagement with the lower or auxiliary check-arm 43 and the detent 55 is in the recess 55ª; but as soon as the trip-lever 47 is released the shutter will move sufficiently to cause the pin 45 to engage with the main check-arm 42, and the detent will enter the recess 55ᵇ, as shown in Fig. 1. The shutter will now have been restored to its normal position.

When the shutter is to be operated for time exposure, the arm 48 of the release-lever 47ª is brought in position to engage the pin 45 after the pin has been released from the check-arm 42, whereupon the pin 45 is held by the arm 48, as shown in Fig. 2, and at such time the opening 28 in the shutter will register with the opening 10 in the camera-plate A, and the exposure is made. When sufficient time has elapsed, the release-lever 47ª is pressed upward, whereupon the arm 48 is disengaged from the pin 45, and the shutter is then free to turn until it again assumes its normal position.

In Figs. 8 and 9 I have illustrated a construction of shutter in which the spring controlling the shutter is wound up sufficiently to admit of one exposure only, and but a single plate 59 is employed, provided with a number of openings and a corresponding number of pins 45$^a$, corresponding to the pin 45 in the construction heretofore described. The shutter-plate 59 is provided with three openings 60, either one of which may be brought in registry with the opening 10 in the camera plate or member A. The same trip-lever and attachments are employed as heretofore described, likewise the same release-lever and the same form of detent, except that the detent is provided with a recess 58, adapted to receive one of the pins 45$^a$, and a stop 57 is employed to limit its inward throw. One of the pins 45$^a$ enters the recess 58 when another pin 45$^a$ is in engagement with the longer check-arm 43; but when the lever 47 is released and the pin 45$^a$ formerly in engagement with the arm 43 engages with the main check-arm 42 the pin formerly in the recess 58 of the detent 55 passes to an engagement with the top of the detent and prevents rebound of the shutter-plates, as shown in Fig. 8. The bridge 61 under this construction extends only from the center of the shutter-plate to the lower portion of the camera-plate A, as shown in Fig. 8. A pin 62 is held to turn in the bridge 61, and this pin 62 is attached to a hub formed upon the inner face of the shutter-plate 59 at its center. The pin 62 extends loosely through and beyond the front face of the camera-plate A, and a drum 63 is mounted to turn on the outer end portion of the pin 62. For convenience in turning the drum it is provided with opposing wings 64. At the base of the drum a series of exterior lugs 65 is formed, and a spring 66 is coiled within the drum, having one end attached to the drum and the other end to the pin 62, as shown in Fig. 10, and when the spring has been wound up the drum is held by a pawl 67, engaging with the lugs 65. Thus it will be observed that when the spring has been fully wound the tension of said spring is sustained by the pin 62 and is therefore directed to the shutter-plate 59, and the said plate will turn when it is free from the influence of the trip-lever 47; but, as stated, the spring will have sufficient power only to move the shutter-plate 59 a sufficient distance to cause an opening 60 to register with the opening 10 in the camera-plate A and then bring a plain surface of the shutter-plate over said opening in the camera-plate.

In Figs. 11 and 12 I have illustrated another adaptation of the shutter, in which the shutter-plates are constructed as shown in Figs. 1, 2, 3, and 4 and are controlled in like manner; but the shutter-plates are provided with three openings 60 instead of with but one, as illustrated in Figs. 1, 2, 3, and 4, and with a corresponding number of pins 45. The bridge 69 employed is straight, and the detent 55 is of the same construction as that illustrated in Fig. 8. The difference in construction relates to the winding mechanism, and in the construction of this mechanism a pin 71 is mounted in the bridge 69 and extends out through the front of the camera-plate A. The said pin is provided with a ratchet-wheel 72 near its front end, engaged by a pawl 73, the pawl and ratchet-wheel being placed in a depression in the camera-plate A, as shown in Fig. 12, and a button 74 is secured to the outer end of the said pin 73, whereby the said pin may be turned. Another difference in construction consists in the fact that the release-lever 47$^a$ is so placed that it must be pressed down instead of up to disengage the arm 48 from the stop-pin 45. A drum 75 is secured to the outer or front shutter-plate 11, and the outer shutter-plate turns around this drum. The pin 71 is provided with a collar 76, located within the drum 75, and a spring 77 is attached to this collar and to a wall of the drum. The spring 77 is prevented from being wound too tight by means of the controlling mechanism heretofore described, and shown in Fig. 7, which mechanism consists of a single toothed wheel 70, secured on the pin or shaft 71, which wheel corresponds to the wheel 23, (shown in Fig. 7,) and this wheel 70 acts in connection with a toothed wheel 78, carried by the bridge 69 or by the inner face of the drum 75, and the wheel 78 corresponds in construction to the wheel 24. (Shown in Fig. 7.)

Having thus described my invention, I claim as new and desire to secure by Letters Patent—

1. A camera-shutter mounted to revolve, a spring arranged to turn the shutter, a trip-lever, and check-arms carried by the trip-lever for engaging and stopping the shutter at a point in its revolution and for releasing the said shutter, and a winding device for the spring, the winding device having a controlling mechanism.

2. In a camera-shutter, a spring arranged to impart movement to the shutter, stops carried by the shutter, a trip-lever adapted for universal use, which lever carries check-arms arranged for alternate engagement with any one of the stops, and a release-lever, which lever carries an arm adapted to check the movement of the shutter when a time exposure is to be made.

3. A camera-shutter, a spring arranged to impart movement to the shutter, and a winding device for the spring, said device comprising a shaft mounted to turn and having a head at one end and a pinion at the other, a drum in which the spring is arranged, an arbor for said drum having a gear-wheel at one end meshing with the pinion on the shaft, a single-toothed wheel connected with the other end of the arbor, and a controlling-wheel having a multiple of teeth, arranged for engagement by the single-toothed wheel, for the purpose specified.

4. A camera shutter consisting of two plates, having one or more registering openings, one of said plates having a limited sliding movement on the other, a spring arranged to turn both of the plates in one direction, a check for the plates, means for releasing the said check, one of said plates having peripheral series of recesses, a detent arranged to enter the recesses of one series, an arm mounted to turn and adapted to enter the recesses of the second series to shift the said plate, as described.

5. A camera-shutter mounted to revolve, a spring for revolving the shutter, a trip-lever carrying check-arms, one of which is longer than the other, and one arm at its free end being below the other, the said arms being adapted to directly engage and stop the shutter, and a release-lever carrying an arm adapted to engage the shutter and check the movement of the same, when a time exposure is to be made.

6. In camera-shutters, a face-plate having a single opening, a shutter mounted to revolve upon the inner surface of the said face-plate, the said shutter being provided with a stop-pin located near its periphery, a trip-lever, check-arms carried by the trip-lever, one of which arms is longer than the other and one arm at its free end being below the other, the said arms being adapted for alternate engagement with the stop-pin, a release-lever, a check-arm carried by the said release-lever, also adapted for engagement with the stop-pin, and means for throwing the check-arm of the release-lever into or out of the path of the stop-pin, for the purpose set forth.

7. In camera-shutters, a face-plate having a single opening, a shutter mounted to revolve upon the inner surface of the said face-plate, the said shutter being provided with a series of stop-pins located near its periphery, a trip-lever, check-arms carried by the trip-lever, one of which arms is longer than the other and one arm at its free end being below the other, the said arms being adapted for alternate engagement with any of the stop-pins, a release-lever, a check-arm carried by the said release-lever, also adapted for engagement with any one of the stop-pins, means for throwing the check-arm of the release-lever into or out of the path of the stop-pins, a detent arranged for engagement with one of the stop-pins when another stop-pin is in engagement with the shorter check-arm carried by the trip-lever, and a winding device for the spring, having a controlling mechanism, which controlling mechanism prevents the spring from being fully wound, for the purpose set forth.

8. In camera-shutters, a shutter, a spring propelling device for the shutter, which spring is located within a drum, having one end attached to the drum and another end to the arbor passed through the drum, the spring being given a partial coil before being placed in the drum, a wheel having a single tooth and secured to the outer end of the arbor, an engaging wheel having a multiple of teeth, one of which teeth has a convexed peripheral surface and the other teeth concaved peripheral surfaces, the said wheels being located in circular connecting-depressions, a gear-wheel secured to the inner end of the arbor and means for turning the same, for the purpose set forth.

9. In a camera-shutter, two plates correspondingly apertured and arranged to turn together, one plate having limited sliding movement on the other, and provided with notches in its periphery, and an arm mounted to turn and adapted to engage the notches to shift one plate on the other, whereby the aperture or apertures in one plate may be reduced in diameter, as described.

10. In a camera-shutter, two plates correspondingly apertured, and arranged to turn together one plate being provided with notches in its periphery and having limited sliding movement upon the other, a rod mounted to turn and carrying an arm adapted to engage the notches and shift the said plate, the said rod being provided with a pointer adapted to travel over a scale, and means for holding the said plate in the adjusted position, substantially as set forth.

11. In camera-shutters, a shutter mounted to rotate, checks for the shutter, one of which is arranged to be operated in both time and instantaneous exposures, the other check being operated only when time exposure is required, a pinion carried by said shutter, a drum provided with a gear-wheel, connected with said pinion, a spring for imparting movement to the drum, the said spring being given a quarter wind or turn before being placed in the drum, and a winding device for imparting another quarter wind or turn to the spring, as specified.

12. The combination with the camera-plate having an opening therein, of a shutter mounted to revolve, a drum arranged to impart movement to the shutter, a spring located within the drum for driving the same, means for releasing the shutter and for checking the movement of the same, means for winding the spring, and a controlling mechanism for the spring-winding device, substantially as set forth.

13. The combination, with a shutter, a spring-controlled drum provided with a gear-wheel meshing with a pinion on the shutter, a face-plate upon which the shutter revolves, an arbor passed through said drum and face-plate, a spring attached to the drum and to the arbor, and means for winding the spring, of a device adapted to regulate the winding of the spring, which device consists of a wheel having a single tooth and attached to the arbor, and a mating wheel pivoted on the outer face of the drum and having a multiple of teeth, one of which multiple teeth has a peripheral convexity and the others concaved peripheral surfaces, both wheels being located in circular connecting-recesses in the outer face of the drum, and means for releasing and for checking the movement of the shutter, for the purpose set forth.

14. A camera-shutter mounted to revolve, a spring for revolving the shutter, a trip-lever provided with two check-arms arranged to directly engage and stop the shutter, a release-lever provided with an arm adapted to engage the shutter and check the movement of the same when a time exposure is to be made, and a winding device for the spring, the winding device having a controlling mechanism.

15. A camera-shutter mounted to revolve, a spring arranged to impart movement to the shutter, a trip-lever provided with check-arms arranged to engage and check the shutter, a release-lever, a check-arm carried by the release-lever and also arranged to engage and check the shutter, and a spring-pressed detent for the shutter pivoted upon the camera-plate and adapted for engagement with the shutter when the latter is in the normal position, the said detent being also arranged to engage with the shutter when the latter is released from the normal position, for the purpose set forth.

16. The combination with the front plate of a camera having an opening therein, of a shutter consisting of two circular plates adapted to turn together, a pinion at the center of the outer plate, and having an arbor mounted to turn in suitable bearings, a shaft mounted to turn and having a head at its outer end, and a pinion at its inner end, a drum provided with a spindle and having a gear at its inner marginal face meshing with the pinion on the shutter, a gear secured to the inner end of the drum-spindle and meshing with the pinion on the headed shaft, a spring attached at one end to a collar on the spindle within the drum and at its opposite end to the interior of the drum, means for releasing and for checking the movement of the shutter, and a controlling device for the winding mechanism, substantially as described.

17. In a camera-shutter, a spring arranged to impart movement to the shutter, a trip-lever, and check-arms carried by the trip-lever for stopping the shutter at a point in its revolution and for releasing the said shutter, one of said check-arms being longer than the other, and one arm at its free end being below the other, the free end of each arm being provided with a flange, for the purpose set forth.

18. A camera-shutter mounted to revolve, a spring arranged to impart movement to the shutter, a trip-lever carrying check-arms, one of which is longer than the other and one arm at its free end being below the other, the said arms being adapted to engage and stop the shutter, means for limiting the movement of the trip-lever, a release-lever carrying an arm adapted to engage the shutter and check the movement of the same, and means for limiting the movement of the release-lever, as set forth.

19. A camera-shutter mounted to turn, a spring for turning said shutter, a trip-lever carrying check-arms arranged to engage and stop the shutter, a release-lever carrying an arm adapted to check the movement of the shutter, stops limiting the movement of the trip-lever, and a latch for holding said trip-lever in engagement with one of said stops, substantially as described.

In testimony whereof I have signed my name to this specification in the presence of two subscribing witnesses.

JOHN V. COATS.

Witnesses:
CHARLES COGSWELL,
CHARLES P. HASKINS.